United States Patent Office 3,121,064
Patented Feb. 11, 1964

3,121,064
HYDROGEN HALIDE ACTIVATION OF TiCl$_4$-ALKYL ALUMINUM HALIDE CATALYSTS
Franz Patat and Hans-Jörg Sinn, Munich, Germany, assignors to Farbwerke Hoechst Aktiengesellschaft vormals Meister Lucius & Brüning, Frankfurt am Main, Germany, a corporation of Germany
No Drawing. Filed Jan. 27, 1959, Ser. No. 789,237
Claims priority, application Germany Jan. 31, 1958
1 Claim. (Cl. 252—429)

The present invention relates to a process of regenerating and increasing the activity of low pressure polymerization catalysts for olefins and to the manufacture of very active and selective catalysts, which can be used with advantage for polymerizing olefins, especially ethylene, propylene or butene-(1).

It is known that α-olefins, for example ethylene, propylene or butene-(1) can be polymerized under low pressure and at a low temperature in the presence of a Ziegler-type catalyst, that is a catalyst comprising compounds of the elements of groups 4 to 8 of the periodic table, especially titanium compounds, and reducing and/or alkylating compounds, especially of groups 1 to 3 of the periodic table, preferably aluminum compounds, to yield valuable thermoplasts (cf. British Patents 799,392; 799,823 and 801,031 and Raff-Allison "Polyethylene," pages 74 and seq., especially page 79, para. 1, page 80, para. 1, and page 81 paras. 1 to 5).

The aforesaid catalysts have no constant activity regardless of whether they are used in either insoluble or soluble form. The activity reaches a maximum and then decreases steadily. It has been proposed to admix the catalyst with stabilizing or activating additives, such as traces of oxygen or water, but without result since these additives fail to arrest the ultimate decrease of the catalyst activity.

Now we have found that low pressure polymerization catalysts can be regenerated or their activity be improved by treating the active catalyst with a compound which is free from molecular oxygen and water and capable of forming a covalent linkage, preferably hydrogen halide.

The compounds to be added to the catalyst in accordance with this invention enable a decrease of the catalyst activity to be withheld and also enable exhausted catalysts to be regenerated.

The compounds may be added to the reaction mixture during the polymerization continuously or in dosages, preferably together with the monomer to undergo polymerization or, alternatively, they may be admixed a certain time after the onset of the polymerization.

The compounds are added in an amount of 0.1 to 2 equivalents, calculated on the element belonging to subgroups 4 to 8 of the periodic table, for example titanium. It is, however, advantageous to use one equivalent of substance.

The wider range of 0.1 to 2 equivalents has been indicated in view of the fact that the compounds admixed bind electrons in the manner of a covalent linkage. Since, however, not all of the heavy metal atoms, for example the titanium atoms, are bound in this manner, the proportion in which the compounds are added may vary depending on whether the catalyst is used in soluble or solid form.

As compounds to be admixed with the catalyst there may be used with advantage: anhydrous hydrogen halides, such as hydrogen fluoride, hydrogen chloride, hydrogen bromide or hydrogen iodide or a mixture thereof.

The temperature at which the catalyst is treated is advantageously within the range of 0° C. to 100° C.

The activation or regeneration of the catalyst is even enhanced when the hydrogen halide is admixed with the catalyst together with an alkyl compound of an element belonging to groups 1 to 3 of the periodic table.

The halides are added to the various catalyst systems in varying quantities and proportions and depend of course on the degree to which the catalyst has been exhausted.

It is already known that the polymerization of propylene and the higher α-olefins with a Ziegler-type catalyst yields well crystallized polymers which are either insoluble or scarcely soluble in hydrocarbons and, in addition thereto, amorphous, readily soluble polymers and oils. The well crystallizing polymers have a steric configuration and are isotactic polymers, while the amorphous polymers which have no steric configuration are atactic polymers. To produce the isotactic polymers which are especially interesting plastic materials in an economic manner, selective Ziegler-type catalysts had to be developed, which exclusively or almost exclusively lead to the desired well crystallizing products. Selective catalyst systems are obtained according to Natta, for example from aluminum triethyl and TiCl$_3$, prepared under heated conditions from TiCl$_4$ and H$_2$ (cf. Natta et al., Gazz. Chim. Ital., 87, Fasc. V 528, 549, 570 (1957)).

In a simpler method TiCl$_4$ is reduced with an organoaluminum compound (Ziegler), for example aluminum-ethyl-sesquichloride which is referred to hereinafter as the sesquichloride, or with aluminum-diethyl-monochloride, which is referred to hereinafter as the monochloride. The catalysts so prepared are normally only slightly selective for the polymerization of olefins (cf. Natta cited above). The activity of a catalyst not separated from its mother liquor is inferior to that of a catalyst which has been separated from its mother liquor and washed. It has been found that especially alkyl-aluminum dihalides, for example aluminum-ethyl-dichloride (referred to hereinafter as the dichloride) which is also obtained as a reaction product, exerts a negative influence on the polymerization velocity. The dichloride can be partially removed by washing with an inert solvent.

We have also found that olefins, such as ethylene, propylene or butene-(1) can be polymerized or copolymerized in an especially good yield and good selectivity with a catalyst mixture comprising heavy metal compounds of subgroups 4 to 8 of the periodic table and organo-metal compounds of groups 1 to 3 of the periodic table, provided that a dry hydrogen halide, preferably hydrogen chloride is allowed to act upon the reaction product from TiCl$_4$ and organo-aluminum compound which may contain halogen and has been isolated, washed and suspended in an inert suspension agent, for example a hydrocarbon. The TiCl$_3$-catalysts so prepared are superior to untreated catalysts as regards selectivity and activity.

The treatment with dry hydrogen chloride has the result that organo-aluminum compounds not capable of being washed out, adhering to or included in the titanium catalyst, are quantitatively reacted to give aluminum trichloride, and tetravalent titanium compounds included in the titanium trichloride and previously undetectable in solution, are converted to TiCl$_4$ which is soluble in the inert solvent. The TiCl$_4$ formed can be removed quantitatively from the TiCl$_3$-suspension by washing.

It is known that tetravalent titanium and monoethyl-aluminum dichloride reduce the selectivity and activity in polymerizing α-olefins. During the annealing operation the amount of tetravalent titanium is reduced by further reaction with the dichloride not capable of being removed by washing, the dichloride is neutralized by the hydrogen chloride and the TiCl$_4$ can then be removed completely from the catalyst system by washing.

The treatment of the isolated TiCl$_3$-catalyst with hydrogen chloride could not be expected to lead to a catalyst component, combining an increased activity with an improved selectivity.

The catalysts prepared according to this invention involve the special advantage that they can readily be removed from the polymer so that products of high quality are obtained.

The catalysts is advantageously produced as follows: In a saturated hydrocarbon $TiCl_4$ is reacted in various stoichiometric proportions with sesquichloride and the reaction product which separates is repeatedly washed with an inert solvent. The reaction product so treated is again suspended with the same dispersant and a vigorous current of dry and oxygen-free hydrogen chloride is passed through the suspension for 1–2 hours, while stirring. The reaction of the hydrogen chloride with the organo-aluminum compound is accompanied by a distinct heat effect. The end of the reaction is indicated by a slow decrease and ultimate termination of the heat evolution in the reaction vessel. The entire amount of tetravalent titanium is then removed by repeated washing with an inert solvent.

In carrying out the invention it has proved advantageous to treat the catalyst with hydrogen chloride at a temperature of between 0° C. and 20° C., whereby especially active catalysts are obtained. The treatment may, however, also be carried out at a temperature outside the range indicated above.

The following examples serve to illustrate the invention, but they are not intended to limit it thereto:

EXAMPLE 1

1000 cc. of toluene were admixed at 30° C., while stirring with 5 millimols of bis-cyclopentadienyl-titanium dichloride and 10 millimols of aluminum-triethyl, and ethylene was then introduced into the reaction mixture. As soon as the mixture absorbed less than 10 liters of ethylene per hour, 5–10 millimols of hydrogen chloride were added to the mixture. The hydrogen chloride added caused the mixture to again absorb ethylene; the ethylene absorption subsided only after hours. The reaction was interrupted at the end of 8 hours by the addition of 50 cc. of isopropanol. The formed polymer was separated from the toluene by means of a filter and dried at 60° C. in vacuo.

180 grams of polyethylene having a specific viscosity of 0.95 (measured as a 0.1% solution in tetrahydronaphthalene at 120° C.) were obtained.

EXAMPLE 2

Preparation of Catalyst (a) 100 millimols of a $TiCl_3$-catalyst (Ziegler-type) prepared from ethyl-aluminum-sesquichloride and titaniumtetrachloride and suspended in 150 cc. of a saturated aliphatic hydrocarbon mixture (boiling range: 200–220° C.) were repeatedly washed at room temperature using the same dispersing agent. The extraction with an inert solvent was conducted until the supernatant mother liquor was substantially free from the aforesaid reactants.

(b) 100 millimols of washed $TiCl_3$-catalyst (prepared as described sub item (a) were stirred for 3 hours at 100° C. with the exclusion of air and then extracted three times at room temperature with a saturated hydrocarbon mixture boiling between 200° and 220° C.

(c) 100 millimols of washed $TiCl_3$-catalyst (prepared as described sub item (a) were gassed, while stirring, with dry, oxygen-free hydrogen chloride until the reaction subsided (recognizable by the heat evolved). When the introduction of hydrogen chloride had been terminated, the dissolved tetravalent titanium was removed by washing with an inert solvent. After this treatment, the amount of tetravalent titanium, calculated upon the total quantity of titanium, was 3.7%.

Polymerization of Propylene

A 3.5 liter vessel provided with a stirrer, a gas inlet and outlet was charged with 2 liters of a mixture of saturated hydrocarbons (boiling range: 200°–220° C.) which was free from water and oxygen. In a nitrogen atmosphere and at 50° C. there were added 40 millimols of diethyl-aluminum-monochloride as the activator and 20 millimols each of the catalysts described sub items (a), (b) and (c) above. Propylene was then introduced into the reaction mixture at 50° C. under atmospheric pressure. After 6 hours, the batch was admixed with 40 cc. of butanol, stirred for 1 hour at 80° C. and repeatedly washed with 500 cc. of water. The polymer that was insoluble in the dispersant was centrifuged, subjected to steam distillation and dried. The soluble polymer proportion was obtained from the filtrate after distillation in vacuo by residue determination.

The insoluble polymer was characterized by its reduced specific viscosity (measured as a 0.1% solution in decahydronaphthalene at 135° C.).

The polymerization with the catalysts described sub items (a), (b) and (c) above gave the following results:

TABLE

| Activator | Activator/catalyst, millimols/liter | Preparation of catalyst | Insoluble polypropylene, percent | Yield per unit of volume and time of insoluble polypropylene, grams/liter/hour | η-red of the polymerization product |
|---|---|---|---|---|---|
| $Al(C_2H_5)_2Cl$ | 20/10 | (a) | 87.5 | 16 | 4.6 |
| $Al(C_2H_5)_2Cl$ | 20/10 | (b) | 95.0 | 20 | 6.5 |
| $Al(C_2H_5)_2Cl$ | 20/10 | (c) | 97.0 | 23 | 6.8 |

We claim:

A process for the improvement of the activity and selectivity of a catalyst for the polymerization of olefins, said catalyst consisting of the solid reaction product of (1) titanium tetrachloride and (2) an alkyl aluminum halide selected from the group consisting of ethyl aluminum sesquichloride and diethyl aluminum monochloride which comprises reacting compounds 1 and 2 in inert diluent to form a slurry, treating said slurry with a dry hydrogen halide, washing the so-treated solid compound of the slurry with an inert solvent, and subsequently activating it by the addition of a new portion of the alkyl aluminum halide.

References Cited in the file of this patent

UNITED STATES PATENTS

| | | |
|---|---|---|
| 2,827,446 | Breslow | Mar. 18, 1958 |
| 2,886,560 | Weber | May 12, 1959 |
| 2,971,950 | Natta et al. | Feb. 14, 1961 |
| 3,072,630 | De Jong et al. | Jan. 8, 1963 |